(12) United States Patent
Hassan et al.

(10) Patent No.: US 7,650,864 B2
(45) Date of Patent: Jan. 26, 2010

(54) REMOTE STARTER FOR VEHICLE

(75) Inventors: Hasib Hassan, Belleville, MI (US);
Michael J. OSullivan, Rochester Hills, MI (US)

(73) Assignee: Magna Electronics Inc., Holly, MI (US)

( * ) Notice: Subject to any disclaimer, the term of this patent is extended or adjusted under 35 U.S.C. 154(b) by 19 days.

(21) Appl. No.: 11/941,138

(22) Filed: Nov. 16, 2007

(65) Prior Publication Data

US 2008/0117079 A1     May 22, 2008

Related U.S. Application Data

(60) Provisional application No. 60/859,680, filed on Nov. 17, 2006.

(51) Int. Cl.
| F02N 11/10 | (2006.01) |
| F02N 11/08 | (2006.01) |
| G05B 19/045 | (2006.01) |
| G05B 19/048 | (2006.01) |

(52) U.S. Cl. ............... 123/179.2; 340/901; 340/425.5; 123/179.3

(58) Field of Classification Search ............ 123/179.3, 123/179.4; 340/425.5, 436.1, 426.24, 438, 340/5.65
See application file for complete search history.

(56) References Cited

U.S. PATENT DOCUMENTS

| 4,940,964 A | | 7/1990 | Dao |
| 5,596,319 A | | 1/1997 | Spry |
| 5,736,935 A | * | 4/1998 | Lambropoulos ....... 340/825.69 |
| 5,751,073 A | * | 5/1998 | Ross ....................... 123/179.2 |
| 5,838,255 A | * | 11/1998 | Di Croce ............... 340/825.69 |
| 6,091,340 A | | 7/2000 | Lee et al. |
| 6,130,622 A | * | 10/2000 | Hussey et al. ............... 340/5.61 |
| 6,147,418 A | | 11/2000 | Wilson |
| 6,420,967 B1 | | 7/2002 | Ghabra et al. |
| 6,650,236 B2 | | 11/2003 | Ghabra et al. |
| 6,943,666 B2 | | 9/2005 | Mooney et al. |
| 7,042,342 B2 | | 5/2006 | Luo et al. |
| 7,068,151 B2 | | 6/2006 | Giles et al. |
| 7,197,364 B2 | | 3/2007 | Chernoff et al. |
| 7,243,007 B2 | | 7/2007 | Wilsone et al. |
| 7,258,092 B2 | * | 8/2007 | Beaucaire et al. ......... 123/179.2 |
| 2002/0067245 A1 | | 6/2002 | Campbell et al. |
| 2003/0027548 A1 | * | 2/2003 | Wisnia et al. ............... 455/404 |
| 2003/0222755 A1 | | 12/2003 | Kemper et al. |

(Continued)

FOREIGN PATENT DOCUMENTS

DE     4423132 A1     1/1996

(Continued)

*Primary Examiner*—Stephen K Cronin
*Assistant Examiner*—Arnold Castro
(74) *Attorney, Agent, or Firm*—Van Dyke, Gardner et al; Tim Flory

(57) ABSTRACT

A vehicle starting system for activating an ignition of a vehicle. The system includes a remote transmitting device operable to communicate a start signal in response to a user input, and a control at a vehicle that receives the start signal. The control processes images captured by at least one imaging device to determine if the images are indicative of the vehicle being parked in an enclosed environment. The control activates an ignition of the vehicle in response to the start signal and the image processing.

16 Claims, 2 Drawing Sheets

U.S. PATENT DOCUMENTS

| | | |
|---|---|---|
| 2003/0231550 A1 | 12/2003 | Macfarlane |
| 2004/0227642 A1 | 11/2004 | Giles et al. |
| 2005/0031100 A1 | 2/2005 | Iggulden et al. |
| 2005/0099273 A1* | 5/2005 | Shimomura et al. ...... 340/426.1 |
| 2005/0261816 A1 | 11/2005 | Dicroce et al. |
| 2006/0049922 A1 | 3/2006 | Kolpasky et al. |
| 2006/0052140 A1 | 3/2006 | Hicks, III |
| 2006/0061458 A1* | 3/2006 | Simon et al. ........... 340/426.35 |
| 2006/0192650 A1 | 8/2006 | Shinada |
| 2006/0220806 A1* | 10/2006 | Nguyen ................. 340/426.36 |
| 2008/0068208 A1* | 3/2008 | Hanselman ............ 340/825.72 |

FOREIGN PATENT DOCUMENTS

| | | |
|---|---|---|
| EP | 00778549 B1 | 6/1997 |
| EP | 1571598 A1 | 9/2005 |
| JP | 03125652 A | 5/1991 |
| JP | 2005346647 A | 12/2005 |
| WO | WO 2005114593 A1 | 12/2005 |
| WO | WO 2006015746 A2 | 2/2006 |

* cited by examiner

REMOTE STARTER FOR VEHICLE

This application claims the benefit of U.S. Provisional Application No. 60/859,680, filed Nov. 17, 2006.

FIELD OF THE INVENTION

The present invention relates to remote starters for starting a vehicle ignition from outside of the vehicle.

BACKGROUND OF THE INVENTION

It is known to provide an aftermarket remote starter kit for a vehicle. Such remote starter kits are typically wired to the vehicle ignition wires and are operable to close the circuit to start the vehicle ignition in response to a signal transmitted by a remote device, such as a remote transmitter or key fob or the like. Such remote starters typically only provide a pre-heating function (and optionally may provide a pre-cooling function) for the vehicle.

SUMMARY OF THE INVENTION

The present invention provides a remote starter system for a vehicle that is operable to start the vehicle ignition via a remote transmitter or key fob the like. The remote starter system includes a control or control unit or module at the vehicle that receives the transmitted signal and activates or energizes or starts the vehicle's ignition. The control may include an environment detection function (where the control may determine an external environment at or near or surrounding or partially surrounding the vehicle) and/or may control the vehicle's cabin temperature or climate control system and/or may provide a security function, and may provide such function or functions in response to the transmitted signal from the remote transmitter. The control may communicate one or more signals to the remote transmitter or key fob (which may include a receiver and a display element or alert element) to notify the user that the vehicle ignition has been actuated and/or to notify the user of another vehicle status or accessory status or characteristic/characteristics.

DESCRIPTION OF THE PREFERRED EMBODIMENTS

Figure 1:
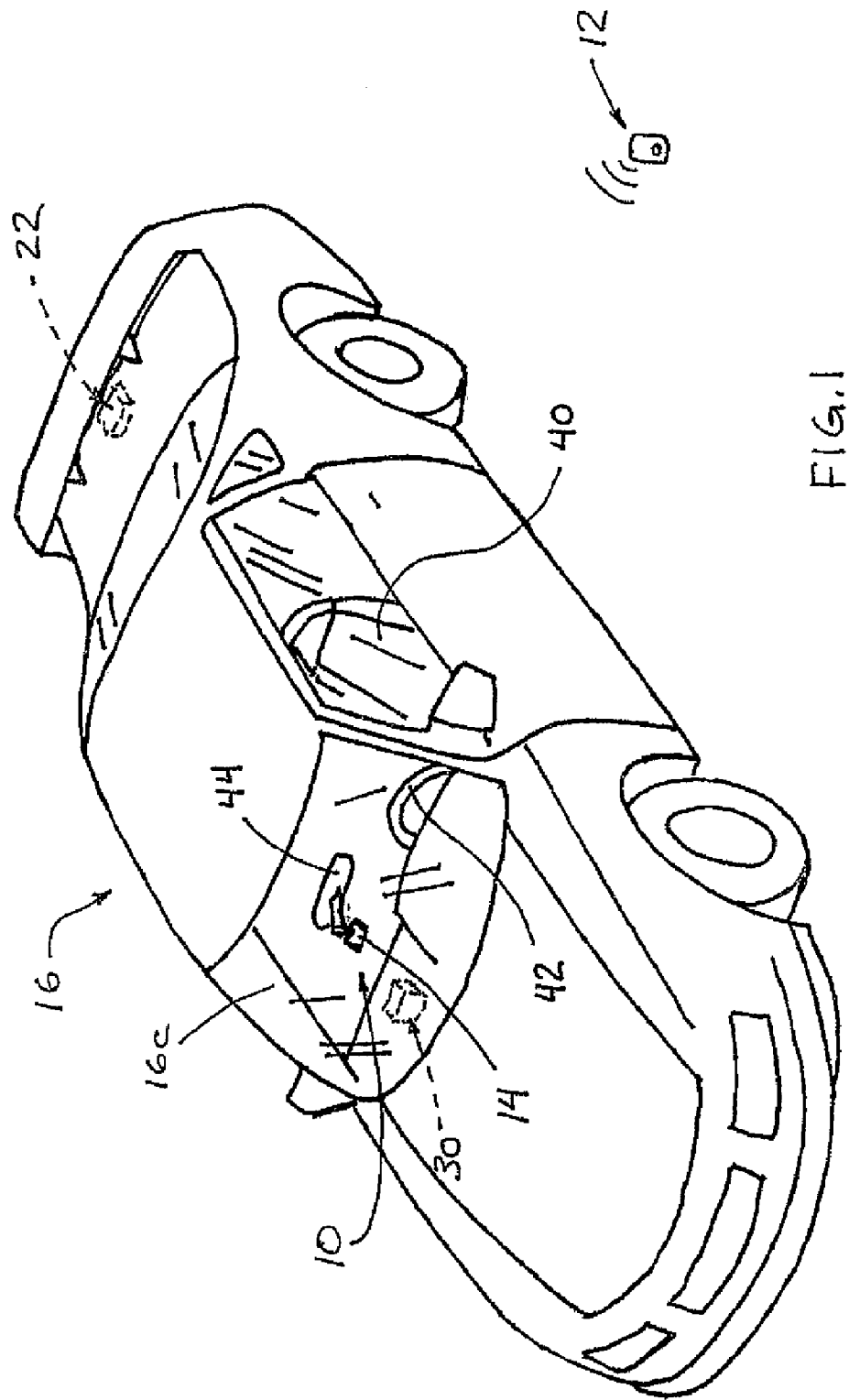
FIG. 1 is a perspective view of a vehicle with a remote starter system in accordance with the present invention.
Figure 2:
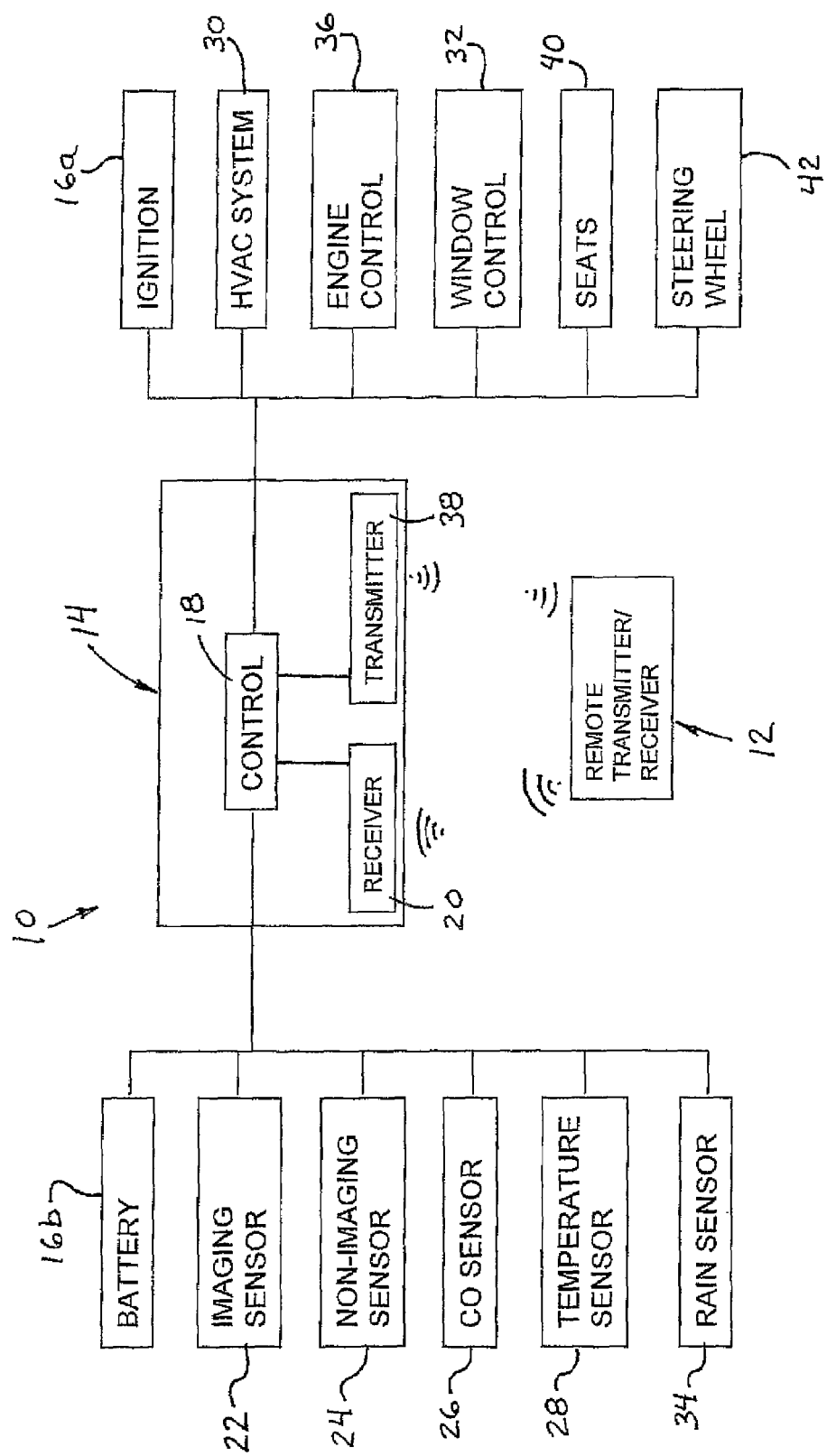
FIG. 2 is a block diagram of a remote starter system for a vehicle in accordance with the present invention.

Referring now to the drawings and the illustrative embodiments depicted therein, a remote starter system 10 includes a remote transmitting device 12 (such as a remote keyless entry (RKE) device or key fob or the like) and a vehicle-based starter unit or remote starter control module 14 that is operable in response to the remote transmitting device 12 to activate or energize the ignition or starter relay of a vehicle 16 (FIGS. 1 and 2). The remote starter control module 14 includes a control or microprocessor 18 that is operable to activate the vehicle ignition when the starter system 10 determines that it is safe or appropriate to start the vehicle, such as in response to a determination of the environment surrounding the vehicle or the like, as discussed below. Optionally, the remote starter system 10 may be incorporated into a vehicle during manufacture of the vehicle (and thus may be an original manufacturer installed accessory), or may be installed as an aftermarket device or system, while remaining within the spirit and scope of the present invention, as discussed below.

As shown in FIG. 2, the remote starter control module 14 includes a receiver 20 and the control 18, which is responsive to receiver 20, which receives a signal, such as a radio frequency (RF) signal or the like, from the remote transmitting unit 12. The control 18 may be connected to the vehicle, such as to a power supply or battery 22 of the vehicle and to the vehicle ignition 24 and/or starter relay 25 and/or engine control module 26, so that the control is powered and is operable to control the vehicle ignition and/or engine control module. Preferably, the control 18 is connected to or in communication with a vehicle communication bus or network or the like, and is operable to communicate with one or more other systems or modules or the like of the vehicle, such as the engine control module 26, a temperature control system 28, an imaging system or vision system or imaging device or camera 30 and/or the like, such as discussed below.

Optionally, and desirably, the remote transmitting unit or key fob 12 comprises a two-way communication device that transmits signals (such as via a radio frequency (RF) transmitter 12a that transmits an RF signal or the like) for reception by the receiver 20 of the remote starter control module 14, and that is operable to receive signals (such as RF signals via an RF receiver 12b) from a transmitter 21 of the remote starter control or module. The key fob 12 may have user inputs or buttons 12c for a user to actuate to selectively transmit the desired or appropriate command/signal (such as "lock", "unlock", "trunk", "panic", "start" and/or the like). Optionally, and preferably, the key fob includes one or more indicators or displays 12d (such as an illumination source or an image display or alphanumeric or iconistic or textual display) for communicating or conveying information to the user of the key fob (such as confirmation that the vehicle has been started or the like), as discussed below. Optionally, the key fob may include an alert or audible device or speaker 12e, such as for generating an audible tone or beep or other audible signal or message to convey information to the user of the key fob, as also discussed below.

The remote transmitter or key fob or RKE feature of the remote starter system thus may perform the lock, unlock, trunk, panic, diagnostic function/functions and/or the like using RF communication/signals/technology. Preferably, the key fob may have a display feature or display element 12d (such as an alphanumeric or iconistic or image display), which may selectively display (in response to a received communication from the remote starter module) any or all of the following: (a) lock, unlock, panic, alarm status as communicated by the remote starter control module; (b) the vehicle in-cabin temperature (whereby the key fob may alert or notify the user by means of a beep or audible tone when the desired cabin temperature is reached after remote start activation); (c) a tire pressure status (such as "OK" or "LOW" or the like), and if a low tire pressure is detected (such as via a one way RF signal from a tire pressure sensor or tire pressure monitoring system 24), an indication of which tire of the vehicle is at the low pressure; (d) any diagnostics code and description if a diagnostics function is selected; and/or (e) a direction (such as up for forward and down for behind or backward) from the key fob to the parked vehicle to assist the user in finding the parked vehicle, such as in a parking lot (wherein such a directional indication may be displayed in response to the user pressing the unlock button or other input or button at the key fob). Optionally, the key fob may display the tire pressure at a particular tire and may alert or notify the user (such as by means of an audible tone or beep) when the tire pressure reaches the recommended level, such as during inflation of the tire. Optionally, any and all of the display functions of the key fob may be provided as an "on demand" feature as well (such as in response to a user input at the key fob).

Optionally, and desirably, the battery life of the key fob may be similar to the battery life of a conventional or known key fob. Optionally, if a rechargeable battery is used in the key fob, then preferably the vehicle or remote starter system may provide a means for recharging the key fob battery during driving of the vehicle (such as via a plug-in connection to the key fob or via insertion of the key in the ignition for key fobs with an integral key). Also, it is desirable that the size of the key fob be similar to the current size of current known key fobs, even with the addition of the display element to the key fob of the remote starter system. Optionally, the key fob may include other functions or inputs while remaining within the spirit and scope of the present invention.

A vehicle equipped with the remote starter system of the present invention thus may be started remotely by activating the remote transmitter or key fob, such as via actuation of one or more of the user inputs or buttons 12c. Optionally, and if the vehicle is equipped with a passive keyless entry (PKE) system or module 32, the remote start feature may be activated while the driver is within the range of the PKE system and a valid connection or link or "hand shake" has occurred between the transponder card and the PKE receiver module of the vehicle. The remote starter system may further function to shut down the vehicle engine if no valid entry into the vehicle occurs within a period of time (such as thirty seconds or thereabouts or more or less depending on the particular application of the remote starter system) following the remote "start" command.

Once the remote start feature is activated, and the vehicle is operating in a "remote start mode", the vehicle starter should be disabled to prevent starter engagement while the engine is running. Optionally, the remote starter system may support or operate in a valet mode, and may provide or include a valet switch override feature for convenience.

Preferably, the remote starter system and associated key fob or remote transmitting device include features that limit or substantially preclude any inadvertent remote start that may occur via inadvertent activation of the remote transmitter or two-way RKE device or key fob. For example, the user may provide the remote start command by first pressing a "lock" button on the key fob, which transmits the "lock" command via an RF signal. The remote start control module or unit receives the command and may communicate (via an RF signal or the like) an acknowledgement signal for the key fob (and the vehicle doors are also locked in response to the lock command). The key fob receives the acknowledgement of the lock signal from the remote starter control module (RSCM) and may display an iconistic or alphanumeric or textual display indicative of such acknowledgement at the display of the key fob to confirm to the user that the vehicle is indeed locked. Then, for example, when the user presses the "lock" button and any other button (such as "unlock", "trunk", "panic", or "function" or the like) simultaneously for a period of time (such as two seconds or thereabouts), the control module may operate to activate or "wake up" the engine control module of the vehicle and engage the starter relay to start the vehicle. A confirmation signal may then be communicated by the remote starter control module to the key fob to inform the user that the vehicle has been started.

Optionally, the remote starter control module or system may include a security function and may be operable to limit or substantially preclude a person entering and/or driving the vehicle after it has been remotely started in response to a signal from the key fob. For example, the control may not allow the vehicle to be shifted out of "park" when in the "remote start mode" unless the vehicle key has been inserted into the ignition. Optionally, for example, the control (or other vehicle module or system or accessory) may function to detect movement of the vehicle (such as via an imaging sensor or camera or imaging system of the vehicle or at the remote starter control module) and the remote starter control may deactivate or shut down the engine and lock the vehicle ignition in response to a detection of vehicle movement when the control and vehicle are in the remote start mode. Thus, the remote starter system may provide a remote starting means for a driver of the vehicle, yet may reduce or substantially preclude theft of the vehicle after the vehicle is remotely started and while the vehicle is operating in the remote start mode.

Optionally, for example, the remote starter system of the present invention may be configured to interface with a vehicle equipped with a smart key immobilizer system and/or a passive keyless entry (PKE) system or module 32 to limit or substantially preclude theft of the vehicle while in the remote start mode. If the vehicle is equipped with a smart key immobilizer system or module 34 (which limits or substantially precludes operation of the vehicle unless the key is recognized by the system), then the control unit or module may, upon receiving the remote start signal from the key fob, activate or wake up both the engine control module and the immobilizer system or module and initiate a series of bus communications to establish that a valid remote start signal has indeed been received. Upon validation of the signal, the immobilizer module may disarm or deactivate the immobilizer and allow the remote starter control module to engage the starter relay to start the vehicle engine.

After the vehicle is started by the remote starter control module, the vehicle is in a "remote start mode" and remains in the remote start mode until the remote start mode is terminated (such as in response to the driver inserting the ignition key into the ignition of the vehicle or unlocking the vehicle doors with a key or via the key fob or the like). While the vehicle is in the remote start mode (i.e. while the vehicle is running with the doors locked), the vehicle doors can only be unlocked if an appropriate signal or command 36 or unlocking event is received or recognized by the control module. For example, the vehicle doors may be unlocked if the remote starter control module (a) receives a valid "unlock" signal from the two-way communication device or key fob; (b) receives a valid "unlock" signal from a passive keyless entry system; (c) determines that a user has manually actuated the door unlock function using a key; (d) receives a valid "unlock" signal from a valet key and/or receives or determines other suitable characteristics or features or activities. While the vehicle is in the remote start mode, the door "lock" function, as may be activated by any suitable system (RKE, PKE, manual key actuation, valet key or the like) may be ignored by the remote starter control unit or module or system.

Optionally, the remote starter control module may provide other security functions or features to limit or substantially preclude theft of the vehicle while the vehicle is in the remote start mode. For example, in the event of a detected break in (such as via a vehicle security system 38 or the like), the remote starter system may shut down the engine immediately and trigger an alert or alarm (such as flashing the exterior lights 40 of the vehicle and/or actuating the vehicle horn 42 and/or other audible device and/or communicating an alert to the remote key fob or the like). For vehicles equipped with a vehicle immobilizer system or module 34, the remote starter control module may operate in conjunction with the immobilizer module to limit or substantially preclude theft of the vehicle while the vehicle is in the remote start mode. For example, the remote starter control module may cooperate with the immobilizer system to immobilize the vehicle immediately upon detection of a break in. Optionally, a signal may be sent to the key fob to alert the user that the engine has been stopped, that the vehicle is immobilized, and that the alarm/alert has been activated. Once the alarm is triggered and the vehicle is immobilized, the alarm may be disarmed upon receiving a valid "unlock" signal from the remote keyless entry (RKE) device or key fob or a passive keyless entry device. After the alarm is disarmed, the vehicle preferably may remain in the immobilized mode, and the immobilizer may then only be disabled upon the immobilizer module receiving a valid key code.

Optionally, the remote starter system may include or may be associated with a cabin monitoring sensor or in-vehicle camera 44 and/or a motion detector 46 (such as a heartbeat sensor or the like) or occupant sensor or the like. Such cabin monitoring devices or occupant detection systems can also be used to determine if anyone is inside the vehicle. For example, the remote start control system may be operable in conjunction with an occupant sensing system. Optionally, for example, the remote starter control module may override the start command and not start the vehicle engine if an occupant is detected in the vehicle. Such an occupant detection system or cabin monitoring system may utilize aspects of the systems described in U.S. Pat. Nos. 6,019,411; 6,485,081 and/or 6,690,268, and/or PCT Application No. PCT/US2005/042504, filed Nov. 22, 2005 and published Jun. 1, 2006 as International Publication No. WO 2006/058098 A2; and/or PCT Application No. PCT/US94/01954, filed Feb. 25, 1994, which are hereby incorporated herein by reference in their entireties.

For example, in the event that the remote starter control module senses movement of the vehicle (such as via an interior imaging sensor or camera or cabin monitoring system 44 or motion sensor 46 or occupant sensor or the like) when the vehicle is in the remote start mode, the remote starter system may shut down the engine immediately and trigger an alert or alarm. Optionally, for a vehicle equipped with an immobilizer system or module, the immobilizer system may immobilize the vehicle immediately upon such detection of vehicle movement. Optionally, and desirably, the remote starter control module may communicate a signal to the key fob to indicate that the engine has been stopped, that the vehicle is immobilized, and that the alarm has been activated. As described above, once the alarm is triggered and the vehicle is immobilized, the alarm may be disarmed upon receiving a valid "unlock" signal from the remote keyless entry (RKE) device or key fob or the passive keyless entry device. After the alarm is disarmed, the vehicle may remain in the immobilized mode, where the immobilizer may only be disabled upon the immobilizer module receiving a valid key code.

Optionally, the remote starter control module or system of the present invention may be responsive to the environment at which the vehicle is parked and/or conditions surrounding the vehicle, in order to provide a safe remote starter system that may limit or substantially preclude remote starting of the vehicle and/or continued operation of the vehicle (while in the remote start mode) when the vehicle may be parked in an area that may be unsafe for continued idling or operation of the vehicle engine. Preferably, the remote starter control module of the present invention thus provides safe (and environmentally friendly) operation of the vehicle while in the remote start mode. Since vehicles typically exhaust carbon monoxide and carbon dioxide emissions during operation of the engine, and since such emission buildup in an enclosed environment can be dangerous, the remote starter control module preferably provides one or more safety measures or features to reduce or mitigate any potential $CO/CO_2$ buildup in situations where the vehicle may be parked in an enclosed environment.

Optionally, for example, the remote starter control module may include or may be responsive to a timing device or timer 48 (and may be responsive to the timer in conjunction with a desired or selected in-cabin temperature setting or threshold temperature, such as determined by an interior cabin temperature sensor 50, as discussed below), in order to determine and limit how long the engine may run during the remote start mode. For example, the remote starter control module may deactivate or shut down the engine when the pre-determined timer value (such as about 5 minutes or about 10 minutes or any other desired or appropriate run-time for the engine) is reached, and may do so even if the timer value is reached before the desired in-vehicle or cabin temperature is reached. Optionally, if the desired cabin temperature is reached within the given run-time period, the engine may continue to run after the desired in-cabin temperature is reached, and until the pre-determined timer value is reached. Optionally, and desirably, the remote starter control module may communicate a signal to the key fob indicating to the user (such as via an iconistic or textual or alphanumeric display at the key fob or via an audible tone or beep) that the desired in-vehicle temperature has been reached. In addition, in situations where the time limit is met, a signal may also or otherwise be communicated or transmitted to the key fob to indicate that the engine has been shut down.

Optionally, the engine may be shut down prior to the timer value being reached if the desired or selected cabin temperature is reached first. In such an application, it is envisioned that the remote starter control module may re-start the engine after a period of time or after it is determined that the cabin temperature has reached a threshold level above or below the selected or desired cabin temperature. Again, the remote starter control module may communicate a signal to the key fob to indicate to the user the status of the vehicle.

Thus, the remote starter system of the present invention may monitor the vehicle temperature (such as engine temperature and/or cabin temperature), and may be responsive to such temperature/temperatures being detected at or above/below threshold temperatures. For example, the remote starter system 10 may be responsive to a temperature sensor 50, such as an interior cabin temperature sensor or the like, and may start the vehicle ignition in response to the remote start command or signal and turn off the vehicle after the cabin temperature is detected to be at or above a desired or threshold temperature. Optionally, the control may override the start command if the system detects a cabin temperature (or optionally the engine temperature or exterior temperature, such as via an exterior temperature sensor 52) that is already at or above (or below for summer cool-down starts and the like) the threshold temperature (whereby it may not be necessary to "warm up" or "cool down" the vehicle).

Optionally, one or more cameras or imaging sensors (such as in applications on vehicles equipped with external cameras 30) can also be utilized to determine whether the vehicle is in an enclosed environment. If the remote starter control determines that the vehicle is parked or located in an enclosed or partially enclosed or substantially enclosed environment based on the inputs from one or more external facing cameras (having an external field of view of an area at or near the vehicle), the remote starter control may override the start command such that the remote start feature is not activated. Optionally, and preferably, the control may communicate a signal to the key fob to indicate to the user (such as via an iconistic or textual or alphanumeric display or via an audible tone or beep) that the remote start feature was not activated due to the vehicle being parked in an enclosed or substantially enclosed environment. In the event that the vehicle is equipped with external cameras, but the camera output is distorted or there is a darkened or low lighting condition (so that the system cannot determine whether or not the vehicle is parked in an enclosed structure), the system may start the engine and utilize the timer approach for the remote start function.

For example, the remote starter control 18 may also be responsive to an external imaging or sensing device or imaging or sensing system 30 of the vehicle or remote starter system, and may analyze the external environment surrounding or at least partially surrounding the vehicle, and may override the start command (as received from the remote transmitter) if it is determined that it may not be safe to start the vehicle or run the vehicle. For example, if a vehicle is parked in an enclosed environment, such as a closed garage or the like, the vehicle, if started and left running to warm up, would exhaust carbon monoxide and carbon dioxide and other gases into the garage which may be unsafe for the driver of the vehicle when the driver later enters the garage to drive the "warmed up" vehicle. Optionally, for example, the control may receive image data or signals indicative of captured images as captured by one or more imaging sensors or cameras at the vehicle and having an external field of view. For example, one or more cameras may capture images of the region exterior of and at least partially surrounding the vehicle, and an image processor may process the images to determine the environment at which the vehicle is located, such as to determine whether or not the vehicle is parked in an enclosed area, such as a garage or the like. If the control determines that the vehicle is parked in an enclosed area, the control may function to override the start command (as received from the remote transmitter) so that the vehicle is not started when the vehicle is parked in an enclosed structure or area.

Optionally, the control may include a learning mode or function which is operable to learn or recognize images captured by the camera/cameras or imaging sensor/sensors. For example, the control may process the captured images and learn what the inside of the vehicle garage looks like, and may readily override the start command when the control recognizes that the vehicle is parked in its garage. Such a learning mode allows the remote starting system to readily and/or quickly recognize a non-start condition, and may allow for such recognition with reduced processing of the captured images.

Optionally, the control or starter unit may also or otherwise be responsive to other detection or sensing means or devices 54, such as non-imaging sensors such as a radar sensor/sensors or ultrasonic sensor/sensors of the vehicle, that sense the environment at and at least partially surrounding the vehicle, in order to determine (or to assist in determining) that the vehicle is parked in an enclosed or at least partially enclosed structure. Such sensors may provide signals that are sufficient for the control to determine that the vehicle is likely within an enclosed structure. Such sensors may be used in conjunction with the video cameras or sensors, and may provide an initial check of the surrounding area (such as at the rear of the vehicle for a back up aid), whereby the cameras may provide a second or confirming analysis of the external area at the vehicle if the initial check by the radar or ultrasonic sensors (or other non-imaging sensors) suggests that the vehicle is parked at an enclosed structure.

The remote starter system of the present invention thus may be operable to detect or analyze the environment at or surrounding the vehicle. The camera or imaging sensor or sensors may be operable in association with a vehicle-based vision system or imaging system or detection system, which may include an imaging sensor or sensors, and/or an ultrasonic sensor or sensors, and/or a sonar sensor or sensors or the like. Optionally, the imaging sensor or camera (which may capture the video images for displaying at a video display device or module) may also be used in conjunction with a radar side object detection system (or other non-imaging detection system, such as ultrasonic sensors or sonar sensors or the like), whereby a detection of an object or wall or the like by the non-imaging detection system may cause the camera to activate for capturing images for further processing by the control to determine if the vehicle may be in an enclosed area. For example, the detection system may utilize aspects of the vision and/or detection and/or imaging systems described in U.S. Pat. Nos. 7,038,577; 6,882,287; 6,198,409; 5,929,786; and/or 5,786,772, and/or U.S. patent application Ser. No. 11/239,980, filed Sep. 30, 2005 by Camilleri et al. for VISION SYSTEM FOR VEHICLE; and/or Ser. No. 11/315,675, filed Dec. 22, 2005 by Higgins-Luthman for OBJECT DETECTION SYSTEM FOR VEHICLE, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 7,005,974; 6,717,610 and/or 6,757,109, and/or of the automatic headlamp controls described in U.S. Pat. Nos. 5,796,094 and/or 5,715,093; and/or U.S. patent application Ser. No. 11/105,757, filed Apr. 14, 2005 by Schofield et al. for IMAGING SYSTEM FOR VEHICLE, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149; and/or Ser. No. 10/534,632, filed May 11, 2005, with all of the above referenced U.S. patents and patent applications being commonly assigned and being hereby incorporated herein by reference in their entireties.

Optionally, the remote starter control system may include or may be associated with an external oxygen or carbon monoxide or carbon dioxide or gas sensor 56 that may be operable to determine the level of CO or $CO_2$ or other gases or emissions at or near the vehicle. Thus, the remote starter control system, when used with a vehicle equipped with such an external sensor, may determine the $CO/CO_2$ level at or around the vehicle and may shut down the engine if the detected $CO/CO_2$ level reaches a threshold level. The remote starter control may communicate a signal to the key fob to indicate to the user (such as via an iconistic or textual or alphanumeric display or via an audible tone or beep) that the engine has been shut down due to an elevated level of CO and/or $CO_2$ gases around the vehicle.

Optionally, for example, the remote starter may be responsive to a carbon monoxide (CO) or carbon dioxide ($CO_2$) gas sensor or sensors 56 at the vehicle, such that the vehicle ignition may be deactivated or turned off in response to a detection of a threshold level of carbon monoxide or carbon dioxide at or near or in the vehicle. Thus, in situations where the vehicle is parked at a location where the gases exhausted or emitted by the vehicle during operation exceeds a threshold level (where it may be potentially harmful to the driver of the vehicle or other vehicle occupant if exposed to such levels for a sufficient period of time), the vehicle ignition may be automatically deactivated to limit or substantially preclude further increasing of the emission levels by the controlled or host vehicle.

The remote starting system thus may start the vehicle when the vehicle is not parked in an enclosed structure, but may override the start command in situations where the vehicle is parked in an enclosed structure or when the carbon monoxide levels at or near the vehicle exceed a threshold level. The remote starter system of the present invention thus provides a safe starting system that starts the vehicle when it is safe to do so, but does not start the vehicle if there are conditions surrounding the vehicle that make it potentially unsafe to start and run the vehicle for an extended period of time.

Optionally, and preferably, once the remote start is activated, the remote starter system may operate or control or adjust the engine run time to reduce the exhaust/emissions, as well as reduce fuel consumption, without compromising the primary goal of reaching the desired cabin temperature as fast as possible. For example, the remote starter system may include or may be associated with a heating coil located within a ventilation/heating duct of the vehicle, whereby actuation of the heating coil during the remote start mode may accelerate the heating of the vehicle cabin during cold weather and, thus, may reduce the time required to keep the engine running to warm up the vehicle. It is further envisioned that, during warm ambient temperatures, such as during the summer, an air compressor of the vehicle air conditioning system may be operated at its maximum rating to enhance or increase the cooling of the vehicle cabin. Optionally, the remote starter control module may, while in the remote start mode, control the engine so that the engine may operate by firing a reduced or limited number of cylinders to minimize the exhaust/emissions as well as reduce fuel consumption during the remote start mode. Such reduced firing may occur upon the cabin temperature being detected to be at the desired or selected or threshold temperature. Optionally, the remote starter control module may control the engine to initially operate at an elevated idle speed or high RPM idle speed to reduce the warm up time, and then operate at a reduced RPM idle speed and/or with firing of a reduced number of cylinders or the like, after the cabin temperature is increased to a threshold level. Optionally, a combination of any and/or all of the above mentioned techniques may be utilized to further lower the exhaust and/or emissions of the vehicle and to reduce the fuel consumption during the remote start mode.

For example, the remote starter control may control the idle speed of the vehicle engine (such as via communication to or with the engine control module 26 or the like) so as to provide a high RPM initial start to reduce the time it takes to "warm up" the engine so that the temperature of the vehicle cabin may be increased in a reduced time period. Optionally, the control may start the vehicle ignition and allow the vehicle to run until the cabin temperature approaches or reaches the targeted or desired or threshold temperature, and then may shut off the vehicle or otherwise reduce the power or fuel consumption/requirements of the vehicle. For example, the control may detect that the cabin temperature is at or near a threshold or targeted temperature, and may control or adjust the vehicle engine control to operate the vehicle engine at a reduced RPM idle speed or to operate the vehicle engine with a reduced number of cylinders firing, or to otherwise decrease power and fuel consumption by the vehicle when the cabin temperature approaches or reaches the desired or targeted temperature. Optionally, the control may adjust or control the climate control system or automatic temperature control system or HVAC system to achieve the desired temperature and may reduce the fan setting or temperature setting (or may deactivate the air conditioning) to maintain the cabin temperature at or near the desired or targeted temperature. Optionally, the control may deactivate the vehicle ignition to shut down the engine when the targeted cabin temperature is reached, and then may automatically restart the vehicle ignition if the temperature drops below the threshold temperature or a second threshold temperature, so that the vehicle will be at or near the desired or targeted temperature when the driver arrives at the vehicle.

Optionally, the remote starter system of the present invention may be operable to control the climate control system or temperature control system or heating/ventilation/air conditioning (HVAC) system 28 of the vehicle to adjust the cabin temperature of the vehicle toward a desired or targeted temperature. For example, the remote starter system may detect an ambient temperature at or in the vehicle and may determine whether or not the cabin temperature is to be increased or decreased. For example, if the detected ambient temperature is low, then the control may operate to heat the vehicle cabin to increase the cabin temperature toward a desired or targeted or threshold temperature (such as, for example about 70-75 degrees or thereabouts), such as by activating the heater of the vehicle to heat the cabin to raise the cabin temperature toward the desired or targeted temperature. Optionally, for example, if the detected ambient temperature is high, then the control may operate to cool the vehicle cabin to reduce the cabin temperature toward a desired or targeted or threshold temperature (such as, for example, about 70-75 degrees or thereabouts), such as by activating the air conditioning of the vehicle to cool the cabin to reduce the cabin temperature toward the desired or targeted temperature. Optionally, the control may control the adjust the temperature setting and/or fan speed and/or air conditioning of the vehicle temperature control system to provide the desired heating/cooling of the vehicle cabin when the engine is running and in response to the start command as received from the remote transmitter. Thus, the remote starter system of the present invention provides a remote starting capability that is desirable to all areas and not just to cold weather states or regions. The remote starter system may function to heat the vehicle cabin for a person starting their vehicle during a Michigan winter, and may function to cool the vehicle cabin for a person starting their vehicle in Arizona.

Thus, upon remote start activation, the remote starter control module, when implemented in a vehicle equipped with an automatic temperature control system (ATC), may activate the ATC system to warm up or cool down the cabin temperature according to the preset temperature, including dual zone setting. Control of window defroster and rear defogger during the remote start mode may vary based on the detected weather conditions (such as via a rain sensor or temperature sensor of the vehicle). In winter weather (or while raining), the window defroster and/or rear window defogger may be activated to clear the windows as quickly as possible.

Optionally, the remote starter control module, when implemented in a vehicle equipped with a manual HVAC system, may control the HVAC system via other suitable hardware or elements. For example, the control module may determine an appropriate cabin temperature by determining the cabin temperature (such as via an in-cabin temperature sensor 50) and the external or ambient temperature (such as via an outside temperature sensor 52 of the vehicle). The outside temperature sensor may provide a temperature reading, such as from an intake manifold temperature sensor or a coolant temperature sensor or a thermistor mounted at the exterior of the vehicle or the like, while remaining within the spirit and scope of the present invention.

Optionally, the remote starter system may control a window control system or mechanism 58 for opening/closing the vehicle windows or sunroof, and the remote starter system may be operable to slightly open or crack the windows of the vehicle to enhance cooling of the vehicle. Optionally, and desirably, the remote starter system may include or may be associated with a rain sensor 60 for determining if it is raining before proceeding with opening the windows. If rain is detected, the "open window" command may be overridden to avoid water intrusion into the vehicle.

The vehicle cabin temperature thus may be automatically set to the desired or targeted temperature, so that the driver may activate the remote transmitter to start the vehicle and then may later arrive at and enter the vehicle cabin, which may by then be at or near the desired temperature. Optionally, the remote starter system may be programmable or adjustable to select or change the target temperatures so that the vehicle cabin is heated and/or cooled toward the selected target temperature/temperatures that are selected by the driver of the vehicle. Optionally, the remote starter system may include or may be associated with an auxiliary heating device or heater coil, which may be operable to provide heat at the temperature control system or HVAC system or the like to expedite the heating of the vehicle cabin. Optionally, the remote starter system and/or temperature control or HVAC system may channel heat from the engine compartment to enhance or expedite heating of the vehicle cabin when the vehicle ignition is activated. The remote starter system thus provides a "smart" climate control system that may rapidly heat or cool the vehicle cabin in response to a remote start signal or command from the remote transmitter 12.

Optionally, and preferably, the remote starter system may provide an alert signal to the driver of the vehicle when the vehicle cabin is at or near the targeted temperature. For example, the control may transmit a signal to the remote transmitter 12 (which may include a receiver or may comprise a transceiver for transmitting and receiving signals to provide a two-way communication between the remote transmitter and the control of the remote vehicle starter system), whereby the remote transmitter may display an iconistic or alphanumeric or textual or image display, or may provide an audible tone or beep (via activation of a speaker or audio device) or may flash a light (such as a light emitting diode (LED) or the like) or otherwise indicate to the driver or user that the vehicle cabin is at or near the desired temperature. Other communication means or alert may be provided, such as a flashing of the vehicle lights or the like, may be provided to alert the driver that the vehicle is warned up or cooled down, while remaining within the spirit and scope of the present invention.

Optionally, the remote starter system and/or the vehicle may include other heating or cooling devices or elements for heating or cooling the vehicle toward a targeted temperature to enhance the comfort to the driver of the vehicle when the driver first gets into the vehicle after remotely starting the vehicle. For example, the remote starter system may be operable to activate heated seats 62 of the vehicle or a heated steering wheel 64 of the vehicle in response to the start command from the remote transmitter. Optionally, the seats and/or steering wheel of the vehicle may include a heating/cooling element that is operable to heat or cool the seat and/or steering wheel via the Peltier thermoelectric effect, whereby the seats/steering wheel may be heated when the cabin temperature is below a desired or targeted temperature, and may be cooled when the cabin temperature is above a desired or targeted temperature. The Peltier thermoelectric effect creates a heat difference from an electric voltage and may occur when a current is passed through two dissimilar metals or semiconductors that are connected to each other at two junctions. The current may drive a transfer of heat from one junction to the other such that one junction cools off while the other heats up; as a result, the effect is often used for thermoelectric cooling. The remote starter system of the present invention thus may set the vehicle cabin and/or seats and/or steering wheel to a desired temperature to enhance the experience to the driver of the vehicle upon entering the pre-started vehicle.

Optionally, upon the remote start or upon receiving a valid unlock signal from the key fob or PKE, the remote starter control module may communicate with or to a memory seat system 66 and/or a memory mirror system 68 of the vehicle to adjust the seat and mirror positions so that they are adjusted according to the setting associated with the particular key fob or PKE device or the like. Other customized settings of the vehicle, such as preferred radio station or temperature setting or the like, may also be automatically set or adjusted to the desired setting before the user or driver enters the vehicle.

Optionally, the remote starter control module may have the capability to monitor and control the interior lights 70 of the vehicle, such as the interior dome/map/pocket lamps of the vehicle. For example, if a dome/map/pocket lamp is left on while the vehicle is locked (and optionally armed with a security system), the remote starter control module may deactivate or turn off the lamp, and may re-activate or turn on the lamp upon receiving a valid unlock signal from the key fob.

Optionally, the remote starter unit and control may be incorporated into the vehicle during manufacture of the vehicle, and may be in communication with the various vehicle-based systems or components, such as vehicle ignition, imaging sensors, heated seats and steering wheel and the like. The remote starter system thus may be provided as a vehicle option and provides a safe and smart remote starter that avoids many of the concerns with prior known aftermarket remote starting devices.

Optionally, the remote starter system may comprise a relatively simple system yet robust enough to implement across vehicle platforms with little (or no) modifications. The remote start control module may reside in a location where it may provide an enhanced or optimal RKE range, and at the same time, may not challenge the vehicle manufacturer (or aftermarket installer) to find a location for the control module and the transmitter/receiver. Optionally, and desirably, the remote starter control module may be housed or located or disposed at or in a window electronics module (WEM), which may be located or mounted at the interior surface of the vehicle windshield 16a and generally behind the rear view mirror assembly 16b (i.e. at the windshield and generally or partially between the mirror head and the windshield), so as to be substantially non-intrusive to the forward field of view through the windshield by the driver of the vehicle.

Optionally, the remote starter unit and control of the present invention may be provided as an aftermarket device or unit that is mountable at a vehicle and connectable to a vehicle power and vehicle ignition. For example, the starter unit and control may be located at or in an accessory module or windshield electronics module or the like, which may be mounted at an interior portion of the vehicle, such as at an interior surface of the vehicle windshield 16a, such as at or near the interior rearview mirror assembly 16b of the vehicle. The starter unit may be electrically connectable to a vehicle wire harness (such as via a plug-in connection or the like), such as at the interior rearview mirror assembly and/or at the vehicle headliner or the like, whereby the control may communicate with the vehicle ignition and other systems or accessories as discussed above. For example, the remote starter unit may be electrically connected to a vehicle-based network or communication bus, and may be able to communicate to various vehicle-based cameras or sensors or the like.

Optionally, the windshield electronics module may utilize aspects of the accessory modules or consoles of the types described in U.S. Pat. Nos. 7,004,593; 6,824,281; 6,690,268; 6,250,148; 6,341,523; 6,593,565; 6,428,172; 6,501,387; 6,329,925; 6,326,613; 6,672,744; 6,386,742; and 6,124,886, and/or U.S. patent application Ser. No. 10/739,766, filed Dec. 18, 2003 by DeLine et al. for MODULAR REARVIEW MIRROR ASSEMBLY, now U.S. Pat. No. 6,877,888; Ser. No. 10/958,087, filed Oct. 4, 2004 by Schofield et al. for VEHICLE ACCESSORY MODULE, now U.S. Pat. No. 7,188,963; and/or Ser. No. 11/201,661, filed Aug. 11, 2005; Ser. No. 10/556,754, filed Nov. 15, 2005, now U.S. Pat. No. 7,289,037; and/or Ser. No. 10/355,454, filed Jan. 31, 2003 by Schofield et al. for VEHICLE ACCESSORY MODULE, now U.S. Pat. No. 6,824,281, and/or PCT Application No. PCT/US03/03012, filed Jan. 31, 2003 by Donnelly Corporation for VEHICLE ACCESSORY MODULE, and/or PCT Application No. PCT/US03/40611, filed Dec. 19, 2003 by Donnelly Corporation for ACCESSORY SYSTEM FOR VEHICLE, and/or PCT Application No. PCT/US04/15424, filed May 18, 2004 by Donnelly Corporation et al. for MIRROR ASSEMBLY FOR VEHICLE; and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

Optionally, and preferably, the remote starter control unit or module may comprise a universal starter control unit or module, and may be electrically connected to a vehicle wire harness or communication bus, whereby the control may be operable to recognize the vehicle or type of vehicle and may be able to provide the appropriate signals to or communication with the vehicle depending on the type or manufacturer of the vehicle. For example, the universal starter unit or module may be connectable to a vehicle manufactured by a particular vehicle manufacturer (or to a particular vehicle line or type of vehicle) and may recognize the vehicle or vehicle manufacturer so as to provide the appropriate commands to and to recognize the signals from the vehicle (based on preselected or predetermined parameters of such vehicles (or particular vehicle lines). Thus, the universal starter unit or module may be installed as an aftermarket device in almost any vehicle, and may automatically adapt for communication with and control of the vehicle ignition and/or vehicle-based accessories.

The remote starter system or module of the present invention thus may provide a safe and secured remote starter system, and may also provide an intelligent or smart remote starter system that may address a variety of customer desired features. For example, the remote starter system may be compatible with gas, diesel hybrid engine equipped vehicles so as to be applicable on virtually any vehicle, either as an aftermarket system or as a manufacturer-installed system. Optionally, and desirably, most of the interfaces between the remote starter control module and other modules and/or sensors of the vehicle may be over the vehicle communication bus or network whenever possible. Direct hardware interface may be limited to reduce the system cost as well as complexity. However, it is envisioned that some links may require or include a hardware interface, without affecting the scope of the present invention.

Accordingly, the remote starter system or module of the present invention may provide multiple security and safety and communication features via use of the remote transmitter/receiver/transceiver or key fob and the associated remote starter control unit. The remote starter system thus may provide a complete system that combines a remote start feature with a two-way communication device or two-way remote keyless entry (RKE) system. The remote starter system of the present invention thus is a secured, safe, smart system that delivers many customer desired features, and also addresses and resolves issues pertaining to the location of the system or module, the interfacing of the remote starter system with vehicle systems or modules or accessories, and installation/implementation across multiple vehicles and vehicle lines and vehicle manufacturers.

Changes and modifications to the specifically described embodiments may be carried out without departing from the principles of the present invention, which is intended to be limited only by the scope of the appended claims as interpreted according to the principles of patent law.

The invention claimed is:

1. A vehicle starting system for activating an ignition of a vehicle, said vehicle starting system comprising: a remote transmitting device operable to communicate a start signal in response to a user input; and a control at a vehicle that receives said start signal, said control processing images captured by at least one imaging device to determine if said images are indicative of the vehicle being parked in an enclosed environment, said control being operable to activate an ignition of the vehicle in response to said start signal and said image processing.

2. The vehicle starting system of claim 1, wherein said control overrides said start signal when said image processing determines that said images are indicative of the vehicle being parked in an enclosed environment.

3. The vehicle starting system of claim 1, wherein said control is operable to adjust a climate control system of the vehicle in response to said start signal and said image processing.

4. The vehicle starting system of claim 3, wherein said control is operable to control said climate control system in response to a sensed temperature at the vehicle.

5. The vehicle starting system of claim 1, wherein said control is operable to control an engine control of the vehicle in response to said start signal.

6. The vehicle starting system of claim 5, wherein said control is operable to control said engine control in response to a sensed temperature at the vehicle.

7. The vehicle starting system of claim 1, wherein said control is operable to limit movement of the vehicle when in a remote start mode.

8. The vehicle starting system of claim 1, wherein said remote transmitting device further comprises a receiver, said control being operable to communicate a signal to said receiver of said remote transmitting device to convey information to the user of said remote transmitting device.

9. The vehicle starting system of claim 8, wherein said remote transmitting device further comprises a display element operable to display information to the user of said remote transmitting device in response to said control.

10. A vehicle starting system for activating an ignition of a vehicle, said vehicle starting system comprising:

a remote transceiver device operable to communicate a start signal in response to a user input and to receive a status signal;

a control at a vehicle that receives said start signal and is operable to activate a vehicle ignition of the vehicle in response to said start signal, said control generating said status signal;

said remote transceiver device displaying information to a user of said remote transceiver device in response to said status signal; and wherein said control determines an environment at which the vehicle is parked, said control being operable to activate the ignition of the vehicle in response to said start signal and said determination of the environment at which the vehicle is parked, and wherein said control overrides said start signal when said control determines that the vehicle is parked in an enclosed environment.

11. The vehicle starting system of claim 10, wherein said control processes images captured by at least one imaging device to determine if said images are indicative of the vehicle being parked in an enclosed environment, said control being operable to activate the ignition of the vehicle in response to said start signal and said image processing.

12. The vehicle starting system of claim 11, wherein said control overrides said start signal when said image processing determines that said images are indicative of the vehicle being parked in an enclosed environment.

13. The vehicle starting system of claim 10, wherein said control is operable to adjust a climate control system of the vehicle in response to said start signal.

14. The vehicle starting system of claim 13, wherein said control is operable to control said climate control system in response to a sensed temperature at the vehicle.

15. The vehicle starting system of claim 10, wherein said control is operable to control an engine control of the vehicle in response to said start signal.

16. The vehicle starting system of claim 15, wherein said control is operable to control said engine control in response to a sensed temperature at the vehicle.

* * * * *